Nov. 12, 1963    S. G. JOHNSON    3,110,523
EMERGENCY RELEASING MEANS FOR VEHICLE BRAKES
Filed Oct. 28, 1960

INVENTOR
Samuel G. Johnson
ATTORNEY

United States Patent Office 3,110,523
Patented Nov. 12, 1963

3,110,523
EMERGENCY RELEASING MEANS FOR VEHICLE BRAKES
Samuel G. Johnson, Fort Wayne, Ind., assignor to International Harvester Company, Chicago, Ill., a corporation of New Jersey
Filed Oct. 28, 1960, Ser. No. 65,678
2 Claims. (Cl. 303—71)

This invention relates to emergency releasing means for vehicle brakes and more particularly to new and improved means for releasing a spring actuated, air released vehicle brake in the event the normal air supply for releasing the brake is depleted.

Recent safety regulations promulgated by the Interstate Commerce Commission require motor trucks to be equipped with brakes adequate to control the movement of the truck and such brakes are to be capable of being applied by two separate means. One of the brake application means is to be a parking brake adequate to hold the vehicle on any grade on which it is operated under any condition of loading on a surface free from snow or ice. The regulations further state that the separate means of applying the brakes may be assisted by the service brakes or other source of power provided that failure of the service brake or other power assisting mechanism will not prevent the parking brake from being applied.

In order to comply with the above noted regulations manufacturers of motor trucks used in Interstate Commerce have designed the parking brake and have incorporated the parking brake in the service brake system whereby in an emergency it serves as a source of independent power to assist the vehicle in coming to a safe stop. The parking brake generally in use today involves a piston and cylinder assembly operatively connected to the vehicle brake shoes and spring means acting on the piston whereby the brake shoes are set by means of spring pressure automatically in the advent of low vehicle service brake air pressure or manually at the vehicle operator's discretion. The parking brake is so designed that it takes air pressure to release the spring forces and once the parking brakes are applied they remain in the applied position despite exhaustion of any source of air pressure or leakage of any kind, and the vehicle cannot be readily moved until safe service brake air pressures are built up. Because of this emergency brake characteristic of the spring loaded type parking brake the vehicle can become a detriment to highway safety. The situation has occurred many times where the service air supply is depleted and the parking brake automatically sets the brake shoes as the vehicle is traversing over a public highway and if the service air pressure cannot be immediately replenished so as to release the parking brake the vehicle is stalled on the highway and becomes a dangerous menace to on-coming traffic. Heretofore there was no quick and convenient way of releasing the parking brake inasmuch as the spring force involved made mechanical methods of release impractical. It is therefore the primary object of the present invention to provide quick and efficient means for releasing a parking brake of the spring actuated, air pressure released type in the event the normal air supply is depleted so as to enable the vehicle to be moved in an emergency.

Still another object of the invention is to provide emergency brake releasing means which may be readily incorporated into existing motor vehicle air brake systems without necessitating any substantial change in the system.

A further object is to provide a simple and efficient means for releasing the spring actuated brakes of a motor vehicle in an emergency when the normal means for releasing the brakes malfunctions.

Still another object of the invention resides in the provision of means for operatively connecting a source of fluid pressure to the cylinders of motor vehicle spring actuated air pressure released brakes in the event the normal air supply is incapable of releasing the brakes.

Still another object is to provide means for operatively connecting the cylinders of air released vehicle brakes and one of the pneumatic tires of the vehicle whereby the fluid or air pressure of the inflated tire is utilized to release the brakes in an emergency.

A further object is to provide a simple means involving an auxiliary source of fluid under pressure which ordinarily is not in communication with the brake cylinders of a motor vehicle but which auxiliary source of fluid pressure may be brought in communication with the brake cylinders to release the vehicle brakes.

The foregoing and other important objects and desirable features inherent in and encompassed by the invention together with many of the purposes and uses thereof will become readily apparent from a reading of the ensuing description in conjunction with the annexed drawings, in which.

Figure 1:
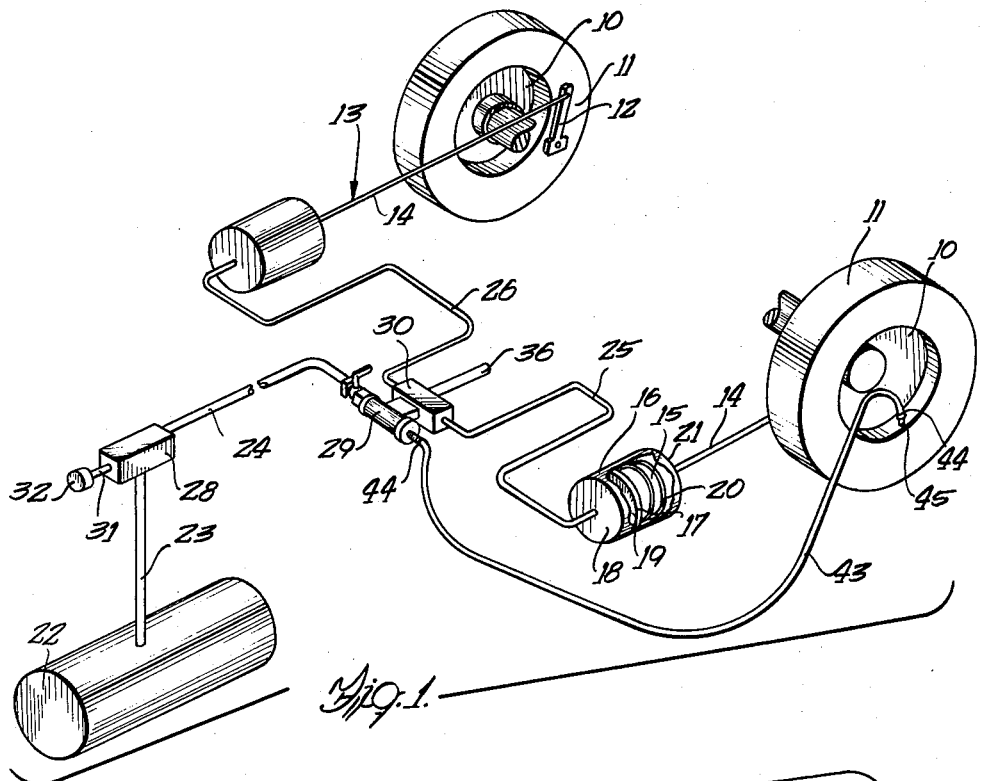
FIGURE 1 is a diagrammatic view illustrating the invention.

Referring to the drawing in detail wherein like reference characters represent like elements throughout the various views, a portion of a motor vehicle air braking system incorporating the invention is shown diagrammatically. The vehicle air brake system includes a pair of ground-engaging wheels 10 having air inflated pneumatic tires 11 mounted thereon. Each of the wheels 10 is provided with a pair of brake shoes, not shown, for engagement with the brake drum, not shown, of the vehicle wheel. The brake shoes are pivotally mounted in a conventional manner and are operatively connected to a slack adjuster or brake actuating lever 12 which is pivotally mounted, as shown. As in conventional brake structures when the slack adjuster levers 12 are rocked in one direction the brake shoes are pivoted and are caused to contact the brake drums and effect braking of the vehicle wheels 10, and, conversely, when the slack adjuster levers 12 are rocked in the opposite direction, the brake shoes are moved out of contact with the brake drums by spring means, not shown.

Each slack adjuster lever 12 is actuated or rocked in one direction to apply the vehicle brake with which it is associated by a spring-operated pneumatically controlled brake mechanism 13. Each brake mechanism 13 includes a cable or rod 14 having one end pivotally connected to the end of a respective slack adjuster lever 12 opposite the end pivotally connected to the vehicle wheel 10 and its opposite end pivotally connected to one end of a piston rod 15. The piston rod 15 extends interiorly of a casing or piston cylinder 16 and its innermost end is provided with a piston 17. The peripheral surface of the piston 17 is adapted to slidingly engage the inner cylindrical surface of the casing or piston cylinder 16 in a substantially air sealed manner. The one side face of the piston 17 and one end wall 18 of the piston cylinder 16 partially define an air chamber 19. A helically wound compression spring 20, disposed within the piston cylinder 16 and encircling the piston rod 15, has one end seated upon an end wall 21 of the piston cylinder 16 and its opposite end abutting the piston 17 to yieldably urge the piston 17 toward the end wall 18 of the piston cylinder 16. The brake mechanism 13 is suitably mounted on the vehicle in proper relationship with the slack adjuster lever 12 with which it is associated such that when air under pressure is exhausted from the air chamber 19 the slack adjuster lever 12 will be rocked by the biasing action of the spring 20 in the direction to apply the vehicle brake through the intermediary of the piston rod 15 and the cable or rod 14.

From the foregoing it will be understood that when air pressure is maintained in the chambers 19 the fluid pressure forces acting on the pistons 17 will counteract the action of the coil spring 20 to retain them in a compressed state and thus maintain the wheel brakes in the off position by permitting the brake shoes to pivot out of contact with the brake drums. When air is exhausted from the chambers 19 the pistons 17 will be displaced by the action of the coil springs 20 causing the cables 14 to move in a direction to effect corresponding rocking movement of the slack adjuster levers 12 to thus force the brake shoes into frictional engagement with the brake drums to apply the wheel brakes.

The fluid pressure system associated with the parking brake mechanism 13 includes a source of fluid under pressure such as a main compressed air reservoir 22 which is connected to the piston cylinders 16 by conduit means comprising pipes or air lines 23, 24, 25 and 26, a two-way shut-off valve 27, a manually operable brake control valve device 28, an air manifold 29 and a quick release valve device 30. The brake control device 28 has a reciprocating operating rod 31 provided with a knob or handle 32 on one end thereof located at any position within the vehicle cab convenient to the vehicle operator. The brake control device 28 is of a conventional type wherein positioning of the control rod in one position permits air under pressure to flow from the reservoir 22 to the air line 24 by way of the air line 23 extending between and connected to the reservoir 22 and the brake control device 28 and movement of the control rod 31 to a second position disrupts the passage of air from the air line 23 to the air line 24 and simultaneously places the air line 24 in fluid communication with the atmosphere to allow exhaust of air pressure from the air line 24.

As shown in FIGURE 1 a two-way shut-off valve 27 is interposed between the air manifold 29 and the pipe 24 leading from the brake control device 28. The valve 27 includes a rotatable valve element 33 having a passageway 34 formed therethrough. The valve element 33 is also provided with an operating handle 35 for rotating the valve element 33. Under normal operating conditions of the vehicle the valve element 33 is in the position shown in FIGURE 2 whereby air can readily flow from the pipe 24 to the manifold 29 through the valve passageway 34. However, when the valve element 33 is rotated 90° from the position shown in FIGURE 2 to the position shown in FIGURE 1, the pipe 24, brake control valve device 29, pipe 23 and air reservoir 22 are no longer in fluid communication with the manifold 29.

The air manifold 29 is in fluid communication with a centrally located inlet port of the quick release valve 30. The purpose of the quick release valve 30 is to reduce the time required to move the brake shoes into abutting engagement with the brake drums by the actuating springs 20 by hastening the exhaust of air pressure from the chambers 19. One end of the body of the valve device 30 is provided with a port which is in communication with the pipe 25 and the opposite end of the valve body is provided with a similar port which is in communication with the pipe 26. The valve body is also provided with an exhaust port which is in fluid communication with an exhaust line 36. The valve body contains a spring-loaded diaphragm, not shown, so arranged as to permit air pressure to flow through the valve body to the pipes 25 and 26 from the manifold 28 in one direction but when the supply pressure is reduced the spring acting on the diaphragm causes the diaphragm to move to a position to disrupt air flow from the manifold 29 and the pipes 25 and 26 and simultaneously the air which has passed through the valve 30 is permitted to escape through the exhaust pipe or line 36.

Figure 2:
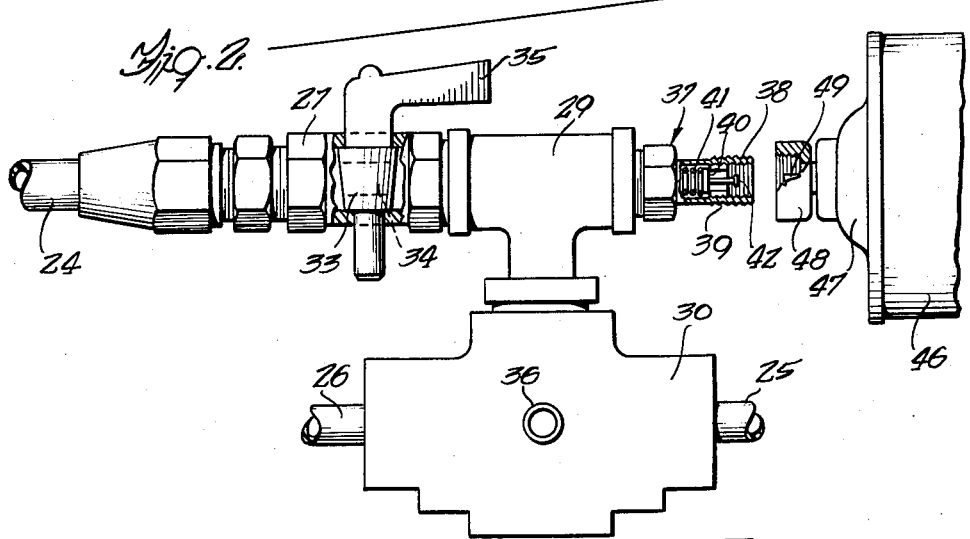
FIGURE 2 is a side elevational view of a section of the conduit means between the main air reservoir and the vehicle brake cylinders.

During normal operation of the vehicle equipped with the parking brake system described hereinbefore, the brake control valve device 28 is in its brake-off position and air pressure from the reservoir 22 is supplied through lines 23 and 24 to the manifold 29 and then through the quick release valve device 30 to the air lines 25 and 26 by moving the diaphragm to unseat the inlet port and simultaneously sealing off the exhaust port. The air is delivered to the piston cylinder 16 to maintain operating air pressure in the air chambers 19 sufficient to compress the brake actuating springs 20 and permit the brake shoes to be pivoted out of engagement with their respective brake drums. When the vehicle operator desires to apply the brake when parking the vehicle he merely moves the control rod 31 to a position wherein the air in the reservoir 22 is isolated from the air line 24. When this occurs the fluid pressure of the air within the air line 24 and the air manifold 29 is reduced and consequently the spring actuated diaphragm of the quick release valve device 30 closes off the inlet port and opens up the exhaust port thereby reducing the air pressure in the air chambers 19 by permitting the air to be exhausted through the exhaust pipe 36. As stated hereinbefore once the source of air pressure is exhausted or leakage of any kind in the conduit means leading from the tank or reservoir 22 to the air manifold 29 whereby the air pressure in the manifold 29 is reduced below the value required to maintain the springs 20 compressed the vehicle brakes will be applied and will remain in the applied position until adequate air pressure is present in the air manifold 29 sufficient to compress the springs 20. Obviously, if the vehicle is stalled on the highway it becomes a dangerous menace to oncoming traffic. The present invention contemplates a quick and easy way of releasing the wheel brakes by compressing the coil springs 20 in an emergency. As best shown in FIGURE 2 a check valve device 37 is threaded on one end of the air manifold 29. The check valve device 37 includes an outer sleeve 38 having screw threads formed on its outer surface. Secured within the outer sleeve 38 is an inner sleeve 39, the innermost end of which serves as a valve seat upon which a movable disk-like valve element 40 is yieldably urged into engagement by means of a spring 41. A valve stem 42 extends longitudinally from the valve element 40 and the outermost end thereof terminates at a point spaced from the outermost end of the outer sleeve 38. The spring 41 and the pressure of the air acting on the valve element 40 maintain the valve element 40 seated upon its valve seat and prevents the escape of air from the air manifold 29.

In the event the operating air pressure becomes abnormaly low in the air manifold 29 for any reason, the wheel brakes will be applied automatically by the actuating springs 20. Obviously, if the motor vehicle is on a public highway when the brakes are applied, the vehicle becomes a dangerous menace to oncoming traffic if it cannot be driven from the highway. The present invention contemplates a quick and convenient way of releasing the brakes in such an emergency whereby the vehicle can be driven off the highway. One embodiment of the invention includes a flexible hose 43 of sufficient length to extend between one of the wheels 10 and the check valve device 37. The flexible hose 43 may be conveniently stored in the vehicle cab when not in use. Each end of the flexible hose 43 is provided with a rotatable coupling element 44 and a check valve device, not shown, constructed in a manner similar to the check valve device 37 described hereinbefore. One coupling element 44 is threaded on the outer sleeve 38 of the check valve device 37 and when securely attached thereto the valve stem 42 of the check valve device 37 and the valve stem, not shown, of the check valve device of the flexible hose 43 are brought into engagement with each other and the valve disk element 40 and the valve disk element, not shown, of the hose check valve device are moved off their respective seats whereby air flow communication is established between the flexible hose 43 and the air manifold 29. The coupling element 44 on the opposite end of the flexible hose is adapted to be screwed onto the externally threaded conventional tire valve assembly 45 carried by the tire 11. The tire valve assembly 45 is similar to the check valve device structure 37 and includes the usual spring urged valve stem, not shown, which when moved inwardly against the action of a spring opens the valve assembly in a manner well known to those skilled in the art. Thus when one of the coupling elements 44 is secured on the tire valve assembly 45 the check valve device of the flexible hose 43 and the tire valve assembly 45 are simultaneously moved to their open positions. It will be appreciated that the compressed air contained within the tire 11 can then flow to the air manifold 29 by moving the valve element 33 of the shut-off valve 27 to the position shown in FIGURE 1 from the normal operating position shown in FIGURE 2, the entire parking brake air line system between the air manifold 29 and the reservoir 22 is operatively disconnected from the piston cylinders 16. Hence, the fluid pressure of the air contained within the tire 11 reacts against the diaphragm of the quick release valve device 30 to close off the exhaust line 26 and simultaneously place the pipes 25 and 26 in fluid communication with the air manifold 29 to permit the fluid pressure of the air in the tire 11 to react against the piston 17 and compress the springs 20 and thus permit releasing of the wheel brakes. Once the wheel brakes are released the flexible hose is disconnected from the tire valve assembly 45 and the check valve device 37 and and the vehicle may be driven off the highway where the necessary repairs to the main fluid pressure supply to the vehicle brakes may be accomplished.

The second embodiment of the invention is similar to the embodiment described hereinbefore inasmuch as a source of fluid under pressure other than the vehicle service or parking brake air system is contemplated for compressing the springs 20 to permit releasing of the vehicle brakes. In lieu of the flexible hose 43 a portable, light weight metallic container 46 of a relatively small size having a frusto-conical neck 47 is conveniently stored within the operator's compartment when not in use. The container 46 contains compressed air or other highly compressed inert gases such as nitrogen, carbon dioxide, etc. The container 46 is provided with an internally threaded coupling element 48 which is adapted to be screwed onto the externally threaded outer sleeve 38 of the check valve device 37 when used. The coupling element 48 is provided with a check valve device of a type similar to the check valve device 37 described hereinbefore and includes an axial stem 49 which when depressed inwardly opens the resiliently biased valve and allows the pressurized gas to be discharged from the container 46. Thus when it is desired to ease the pressurized gas of the container 46 to compress the springs 20 the shut-off valve 27 is conditioned to isolate the air manifold 29 from the pipe 24. Thereafter the coupling element 48 is screwed on the outer sleeve 38 of the check valve device 37 and when the coupling element 48 is securely fastened thereto the stem 49 engages the valve stem 42 and the respective valve elements fixed thereto are moved off their respective valve seats to permit the pressurized gas to flow into the air manifold 29. When this occurs as in the first embodiment of the invention described above, the diaphragm of the quick release valve device 30 is moved to a position wherein the exhaust line 36 is closed and the pipes 25 and 26 are placed in fluid communication with the air manifold 29. The pressurized gas then reacts against the pistons 17 to compress the springs 20.

The embodiments of the invention chosen for the purposes of illustration and description herein are those preferred for achieving the objects of the invention and developing the utility thereof in a most desirable manner, due regard being had to existing factors of economy, simplicity of design and construction and the improvements sought to be effected. It will be appreciated therefore that the particular structural and functional aspects emphasized herein are not to exclude but rather to suggest such other adaptations and modifications of the invention as fall within the spirit and scope of the invention as defined in the appended claims.

What is claimed is:

1. In a motor vehicle having ground-engaging wheels provided with pneumatic tires, a fluid pressure brake system including a piston and cylinder assembly operably connected to the vehicle wheel brakes, said piston being movable between one position corresponding to the brake applied position and a second position corresponding to the brake released position; biasing means for urging said piston to the brake applied position; a source of fluid pressure; conduit means leading from said source of fluid pressure to said piston and cylinder assembly whereby said fluid pressure is applied to one side of said piston tending to urge it toward the brake released position, said fluid pressure being normally of a magnitude capable of moving said piston to the brake released position, said conduit means having an opening therein; valve means for controlling fluid flow through said opening, said valve means normally closing said opening; manually operable two-way valve device interposed in said conduit means intermediate said opening and said source of fluid pressure conditionable to establish and disestablish fluid communication between said source of fluid pressure and said piston and cylinder assembly; and manually operable means operatively connectable with said valve means and one of said pneumatic tires for providing fluid communication between said one of said pneumatic tires and said conduit means through said opening when said valve means is in its opened condition and said two-way valve device is conditioned to disestablish fluid communication between said source of fluid pressure and said piston and cylinder assembly, said valve means being conditionable to its closed condition upon operative disconnection of said manually operable means therefrom.

2. In a motor vehicle provided with ground-engaging wheels, each of which has an air pressure inflated pneumatic tire mounted thereon, and each of said pneumatic tires is provided with an air inflation valve device, a fluid pressure brake system including a piston and cylinder assembly operably connected to the vehicle wheel brakes, said piston being movable between one position corresponding to the brake applied position and a second position corresponding to the brake released position, said piston being yieldably urged toward the brake applied position; a source of fluid pressure; conduit means leading from said source of fluid pressure to said piston and cylinder assembly whereby said fluid pressure is applied to one side of said piston tending to move it toward the brake released position, said pressure being normally of a magnitude capable of moving said piston to a brake released position, said conduit means having an opening therein; check valve means in said opening normally preventing fluid flow from said conduit means through said opening; a manually operable two-way valve device interposed in said conduit means intermediate said opening and said source of fluid pressure conditionable to establish and disestablish fluid communication between said source of fluid pressure and said piston and cylinder assembly; and manually operable means for operatively connecting any one of said pneumatic tires to said check valve means and for simultaneously opening said check valve means to supply fluid pressure to said conduit means through said opening for moving said piston toward the brake released position in the event the magnitude of said first mentioned source of fluid pressure is incapable of moving said piston to the brake released position and said two-way valve device is conditioned to disestablish fluid communication between said source of fluid pressure and said piston and cylinder assembly including a flexible hose having one end adapted to be detachably secured to an air inflation valve device of one of said tires and the opposite end adapted to be detachably secured to and open said check valve means in order to place said conduit means in fluid communication with one of said pneumatic tires, said check valve means closing simultaneously with the operative disconnection of said hose therefrom to maintain the fluid pressure supplied from said one pneumatic tire through said opening in said conduit means.

References Cited in the file of this patent

UNITED STATES PATENTS

| | | |
|---|---|---|
| 661,584 | Omick | Nov. 13, 1900 |
| 662,152 | Omick et al. | Nov. 20, 1900 |
| 1,238,375 | Wright | Aug. 28, 1917 |
| 2,645,307 | Stegman | July 14, 1953 |
| 2,963,119 | Rager et al. | Dec. 6, 1960 |
| 2,991,129 | Gasser | July 4, 1961 |

FOREIGN PATENTS

| | | |
|---|---|---|
| 442,062 | Great Britain | Jan. 31, 1936 |
| 331,787 | Italy | Nov. 15, 1935 |